US008059160B2

(12) United States Patent
Shinozaki et al.

(10) Patent No.: US 8,059,160 B2
(45) Date of Patent: Nov. 15, 2011

(54) HEAD-SEPARATED CAMERA DEVICE AND CONTROL METHOD THEREOF

(75) Inventors: Hiroshi Shinozaki, Ome (JP); Masatoshi Ookubo, Iruma (JP); Kei Tashiro, Ome (JP); Takashi Tsuda, Ome (JP); Hiroyuki Irikura, Ome (JP); Junya Fukumoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/708,447

(22) Filed: Feb. 18, 2010

(65) Prior Publication Data
US 2010/0302391 A1 Dec. 2, 2010

(30) Foreign Application Priority Data

May 29, 2009 (JP) ................................. 2009-131128

(51) Int. Cl.
*H04N 5/225* (2006.01)
*H04N 5/232* (2006.01)
(52) U.S. Cl. ............ 348/211.14; 348/207.11; 348/211.5
(58) Field of Classification Search ............... 348/207.1, 348/207.11, 211.99, 211.1, 211.4, 211.5, 348/211.11, 211.14
See application file for complete search history.

(56) References Cited

U.S. PATENT DOCUMENTS

| 5,003,399 | A  | * | 3/1991 | Ishimaru et al. | 348/361 |
| 7,443,447 | B2 | * | 10/2008 | Shirakawa | 348/376 |
| 7,471,310 | B2 | * | 12/2008 | Amling et al. | 348/72 |
| 2003/0011691 | A1 | * | 1/2003 | Nagao | 348/231.99 |
| 2006/0238826 | A1 | * | 10/2006 | Itou et al. | 358/448 |

FOREIGN PATENT DOCUMENTS

| JP | 05-252039 | 9/1993 |
| JP | 09-181936 | 11/1997 |
| JP | 10-254825 | 9/1998 |
| JP | 11-252438 | 9/1999 |
| JP | 11-261992 | 9/1999 |
| JP | 2000-259559 | 9/2000 |
| JP | 2008-271254 | 6/2008 |

* cited by examiner

*Primary Examiner* — Daniel M Pasiewicz
(74) *Attorney, Agent, or Firm* — Blakely, Sokoloff, Taylor & Zafman LLP

(57) ABSTRACT

According to one embodiment, a camera control unit outputs serial data containing information for specifying a predetermined control target device to be controlled from among plural control target devices comprised in a camera head. The camera head identifies the control target device specified by the received serial data, and supplies the identified control target device with a select signal for an active state.

10 Claims, 14 Drawing Sheets

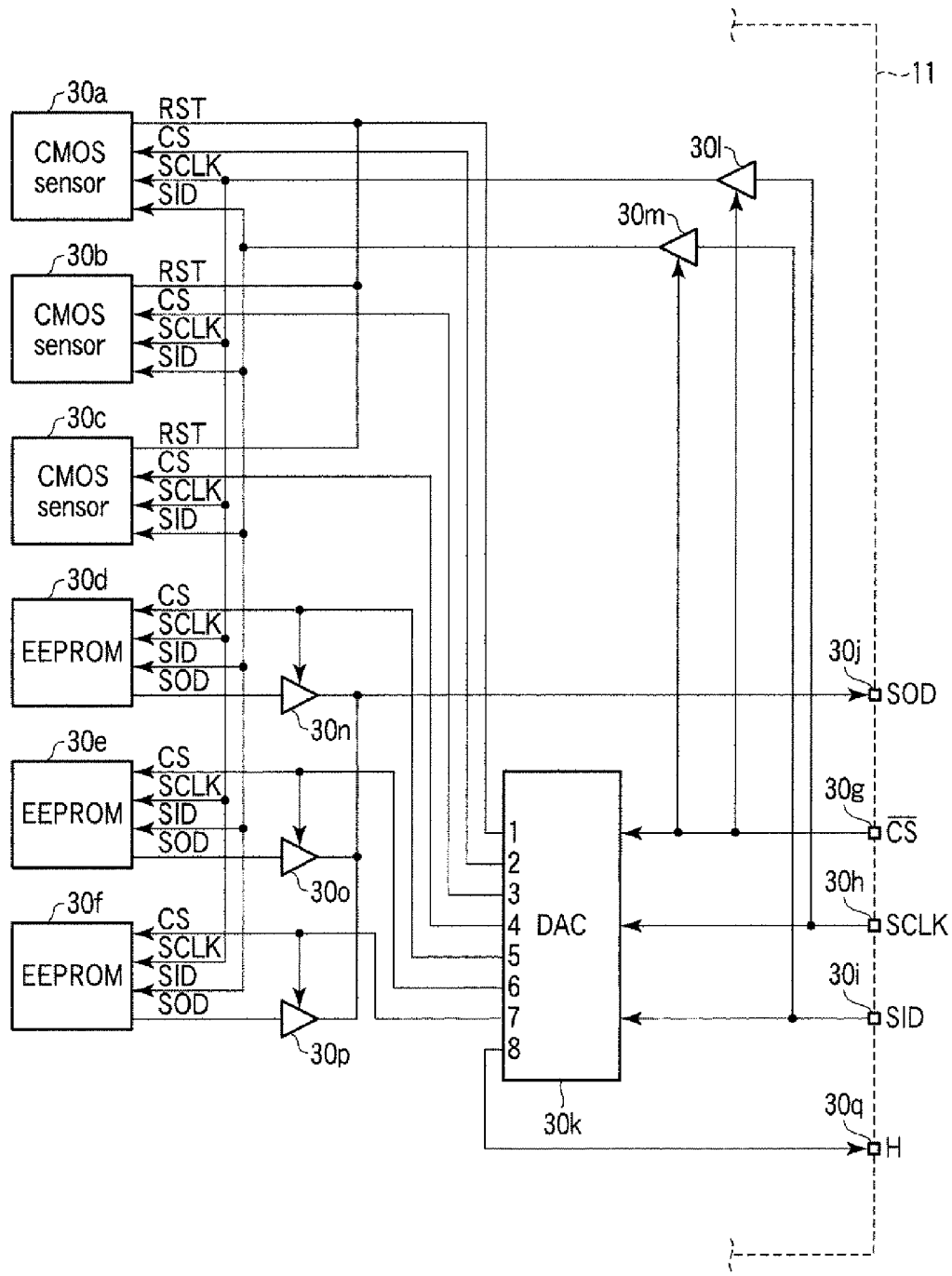
F I G. 5

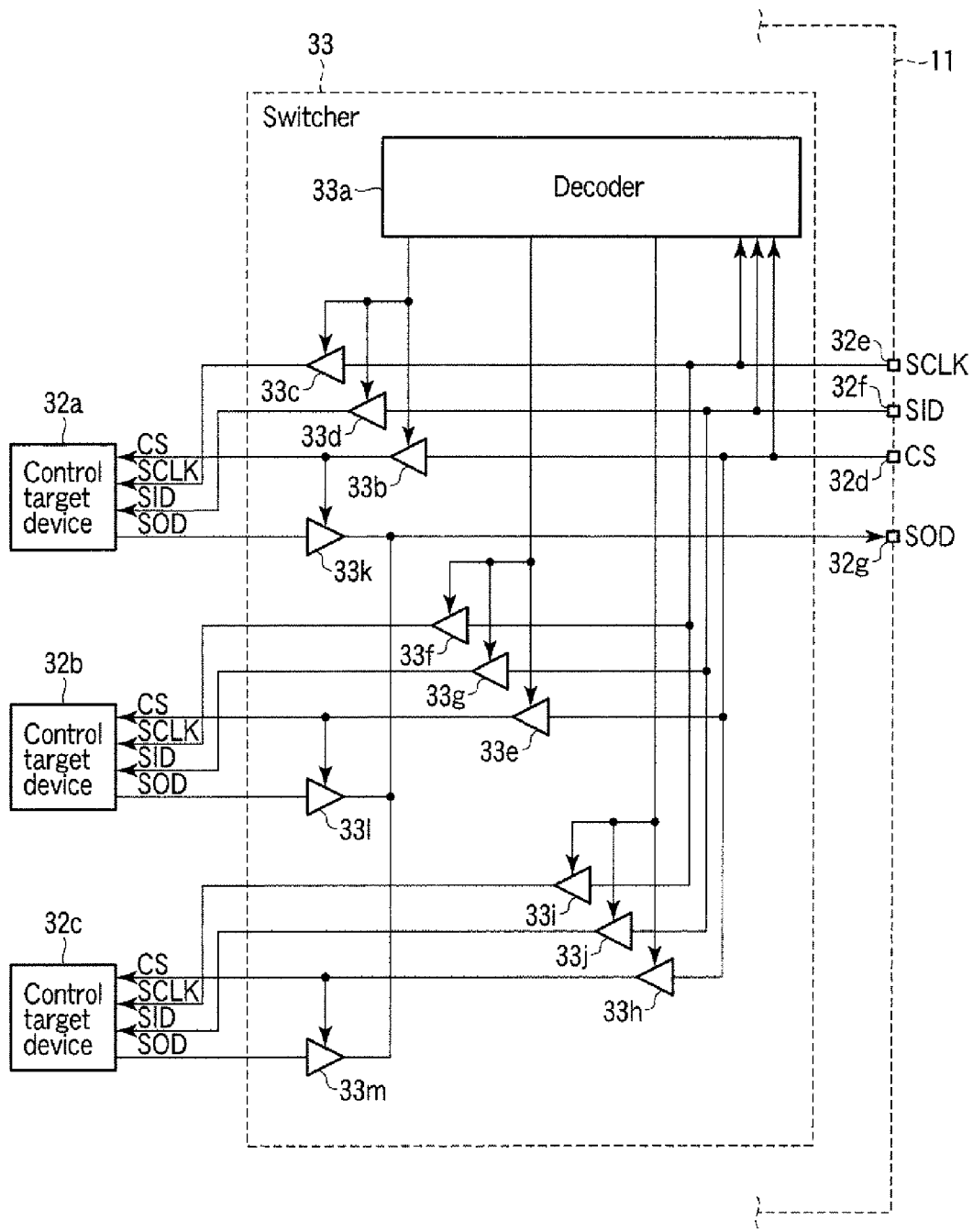
F I G. 7

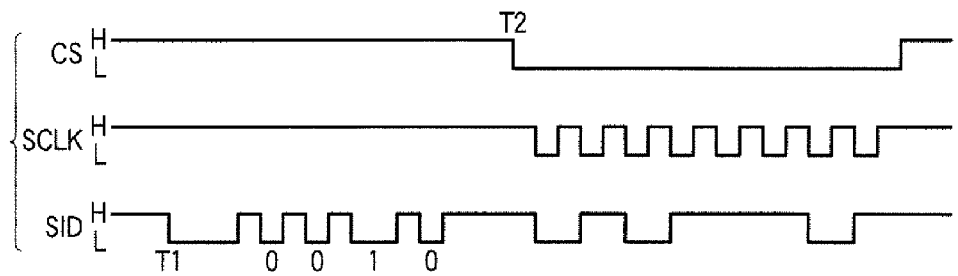
F I G. 8
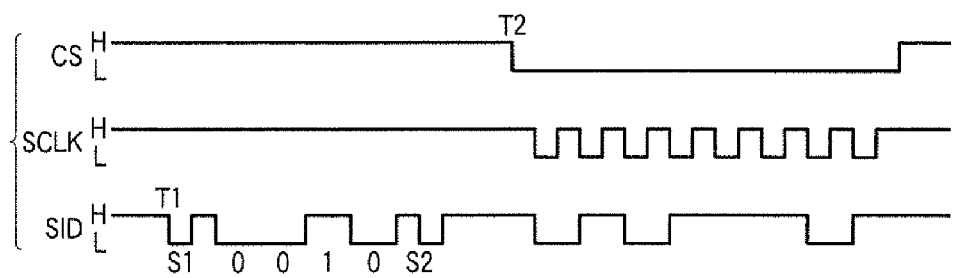
F I G. 9
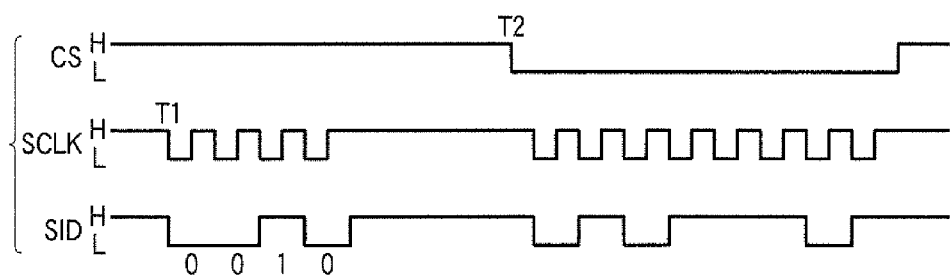
F I G. 10

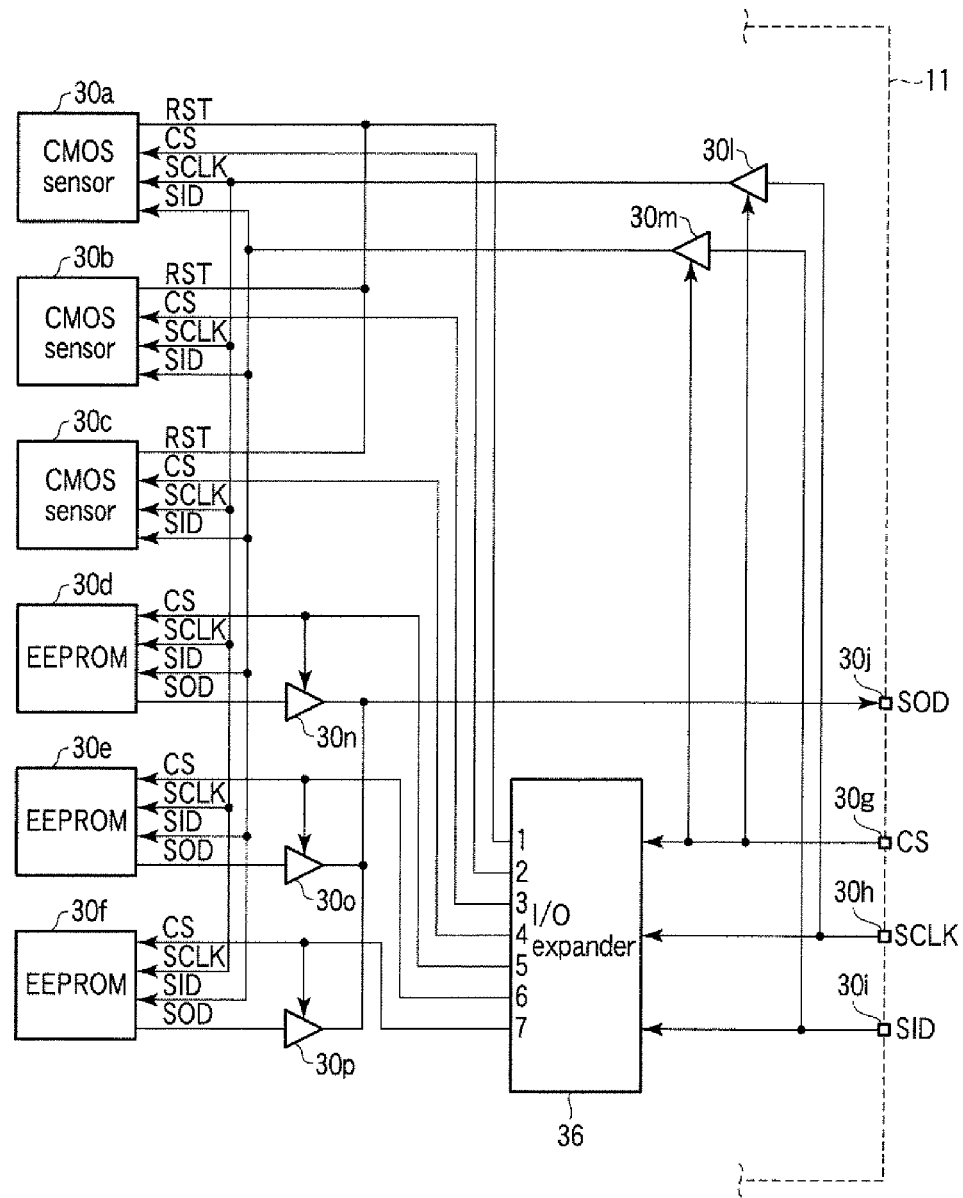
F I G. 19

HEAD-SEPARATED CAMERA DEVICE AND CONTROL METHOD THEREOF

CROSS-REFERENCE TO RELATED APPLICATIONS

This application is based upon and claims the benefit of priority from Japanese Patent Application No. 2009-131128, filed May 29, 2009, the entire contents of which are incorporated herein by reference.

BACKGROUND

1. Field

One embodiment of the present invention relates to a head-separated camera device and a control method thereof in which a camera head and a CCU (camera control unit) for controlling the camera head are separate from each other.

2. Description of the Related Art

As is known well, a head-separated camera device as described above is configured such that, for example, a camera head and a CCU are respectively constituted as separate members both connected mutually through a camera cable which bundles plural signal lines. The camera head comprises a solid-state imaging element such as a CMOS (complementary metal-oxide semiconductor) sensor. The CCU supplies a drive control signal to a solid-state imaging element of the camera head, and obtains a video signal by performing a signal processing on an output from the solid-state imaging element.

Recently, modifications aiming for much higher function and performance have been made to the head-separated camera device. Accordingly, types and bit rates of signals which are transferred between the camera head and the CCU have been increasing greatly. The number of signal lines bundled in the camera cable has therefore increased and thickened the camera cable itself, and the number of terminals provided on a connector for connecting the camera cable and the camera head has also increased and resulted in that the connecter tends to have a larger size.

In general, head-separated camera devices are developed for the purpose of, for example, visually inspecting narrow areas where people cannot enter and camera heads thereof are demanded to be downsized as much as possible. Therefore, thickening of a camera cable and upsizing of a connector for connecting a camera cable are considered as factors which hinder downsizing of camera heads, and hence involve a serious problem to be avoided.

Jpn. Pat. Appln. KOKAI Publication No. 10-254825 discloses a technique of reducing the number of terminals in a semiconductor integrated circuit by common use of any communication terminal and any other terminal (such as a reference voltage terminal) among three bus lines in a semiconductor integrated circuit which comprises communication terminals for data communication and is equipped with a data communication function according to a three-line-type serial data transfer scheme.

Jpn. Pat. Appln. KOKAI Publication No. 11-252438 discloses a technique of reducing the number of cables between a camera head unit and a main camera unit by adopting a configuration as follows. A composite synchronization signal and a control signal of the camera head unit are transferred, multiplexed with each other, from the main camera unit to the camera head unit. A composite synchronization signal, a status signal of the camera head unit, and a video signal are transferred, multiplexed with each other, from the camera head unit to the main camera unit.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is a block configuration diagram for describing an example modification to the camera head represented in FIG. 2, according to the embodiment;

FIG. 7 is a block configuration diagram for describing another example of a camera head in the head-separated camera according to the embodiment;

FIG. 8 is a timing chart for describing an example of control operation for control target devices by a switcher in the camera head represented in FIG. 7, according to the embodiment;

FIG. 9 is a timing chart for describing another example of control operation for control target devices by a switcher in the camera head represented in FIG. 7, according to the embodiment;

FIG. 10 is a timing chart for describing still another example of control operation for control target devices by a switcher in the camera head represented in FIG. 7, according to the embodiment;

FIG. 19 is a block configuration diagram for describing an example modification to the camera head represented in FIG. 2, according to the embodiment.

DETAILED DESCRIPTION

Various embodiments according to the invention will be described hereinafter with reference to the accompanying drawings. In general, according to one embodiment of the invention, a camera control unit outputs serial data containing information for specifying a predetermined control target device to be controlled from among plural control target devices comprised in a camera head. The camera head identifies the control target device specified by the received serial data, and supplies the identified control target device with a select signal for an active state.

Figure 1:
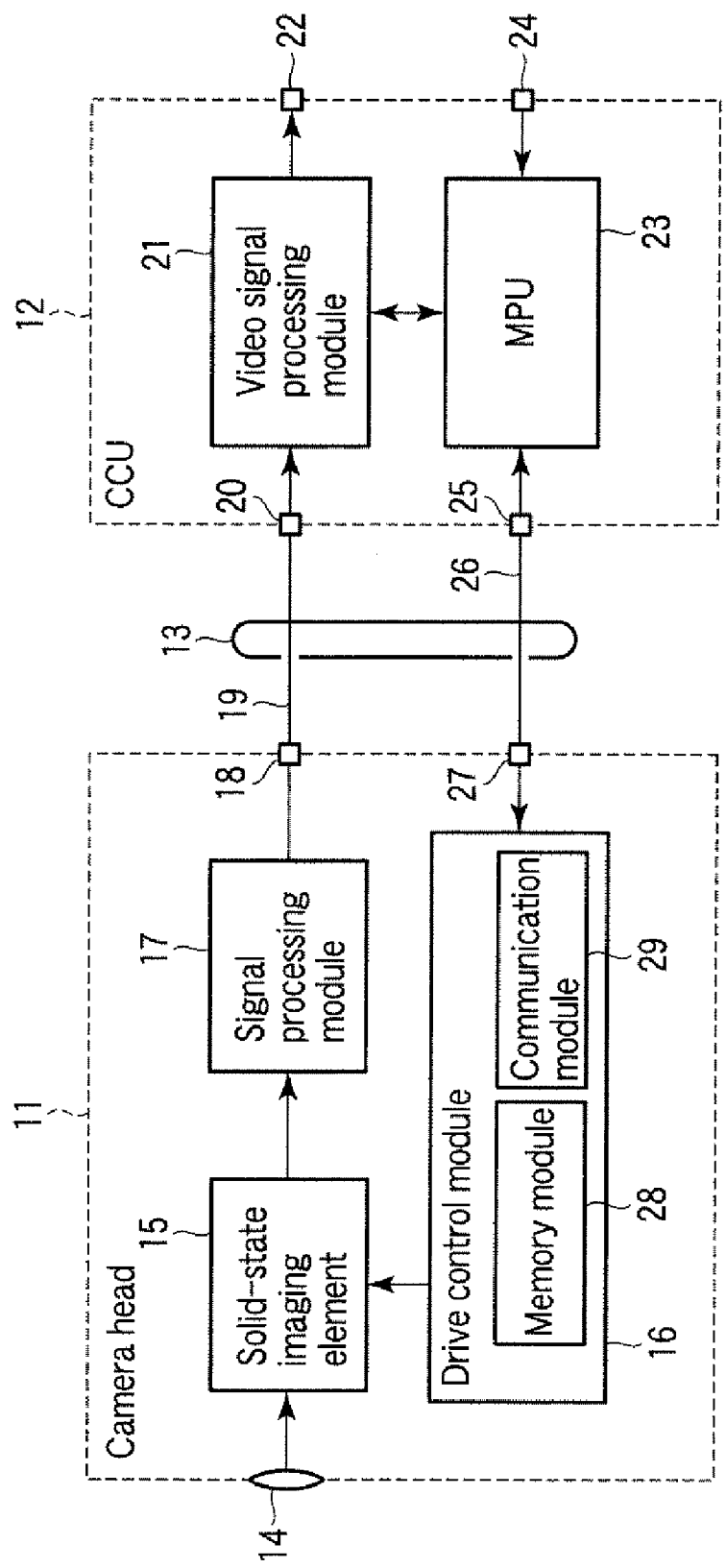
FIG. 1 is a block configuration diagram representing an embodiment of the present invention, to describe an entire signal processing system of a head-separated camera.

FIG. 1 illustrates a total signal processing system of a head-separated camera described in this embodiment. That is, the head-separated camera is configured such that a camera head 11 and a CCU 12 which controls the camera head 11 are connected to each other by a camera cable 13.

In this configuration, the camera head 11 comprises an imaging lens 14. An optical image of a subject which is let enter through the imaging lens 14 is formed on a light receiving surface of a solid-state imaging element 15 which is constituted by, for example, a CMOS sensor. Based on control from a drive control module 16, the solid-state imaging element 15 converts the optical image formed on the light receiving surface into a corresponding video signal, and outputs the video signal to a signal processing module 17.

The signal processing module 17 performs a predetermined signal processing such as a sample hold processing or a video-synchronization-signal generation processing on the video signal input, and thereafter supplies the video signal and the video synchronization signal to an output terminal 18. The video signal and the video synchronization signal supplied to the output terminal 18 are further supplied to an input terminal 20 of the CCU 12 described above through a signal bus line 19 which constitutes part of the camera cable 13.

The CCU 12 supplies a video-signal processing module 21 with the video signal and the video synchronization signal both supplied to the input terminal 20, and performs a preset predetermined signal processing thereon. Further, the video signal and the video synchronization signal both output from the video signal processing module 21 are output to an unillustrated monitor through an output terminal 22, and are thereby subjected to video display.

The CCU 12 comprises a micro processing unit (MPU) 23. The MPU 23 receives operation information of a user which is supplied from outside through an input terminal 24. The MPU 23 controls the video signal processing module 21 so as to reflect the operation information, generates a control signal for the camera head 11, and supplies the control signal to the control terminal 25.

The control signal supplied to the control terminal 25 is supplied to a control terminal 27 of the camera head 11 through a control signal bus line 26 which also constitutes part of the camera cable 13. The camera head 11 supplies the drive control module 16 with the control signal supplied to the control terminal 27.

Based on the input control signal, the drive control module 16 generates a drive control signal for controlling various processing operations of the solid-state imaging element 15, and supplies the drive control signal to the solid-state imaging element 15. The drive control module 16 further comprises a memory module 28 for storing various setting information for the solid-state imaging element 15, and performs drive control of the solid-state imaging element 15, using together the information in the memory module 28 upon necessity.

The drive control module 16 also comprises a communication module 29 which performs information communication with the MPU 23 of the CCU 12. The drive control module 16 functions to receive a control signal from the MPU 23 through the communication module 29, and to transfer various information (such as content stored in the memory module 28) in the camera head 11 to the MPU 23, based on a request from the MPU 23.

Hence, this embodiment is configured to be capable of controlling the camera head 11 without increasing the number of lines included in the control signal bus line 29 constituting the camera cable 13, even if the number of various control target devices to be controlled, such as the solid-state imaging element 15, drive control module 16, signal processing module 17, memory module 28, and communication module 29 which constitute the camera head 11, increases to achieve high function and performance for the camera head 11.

Figure 2:
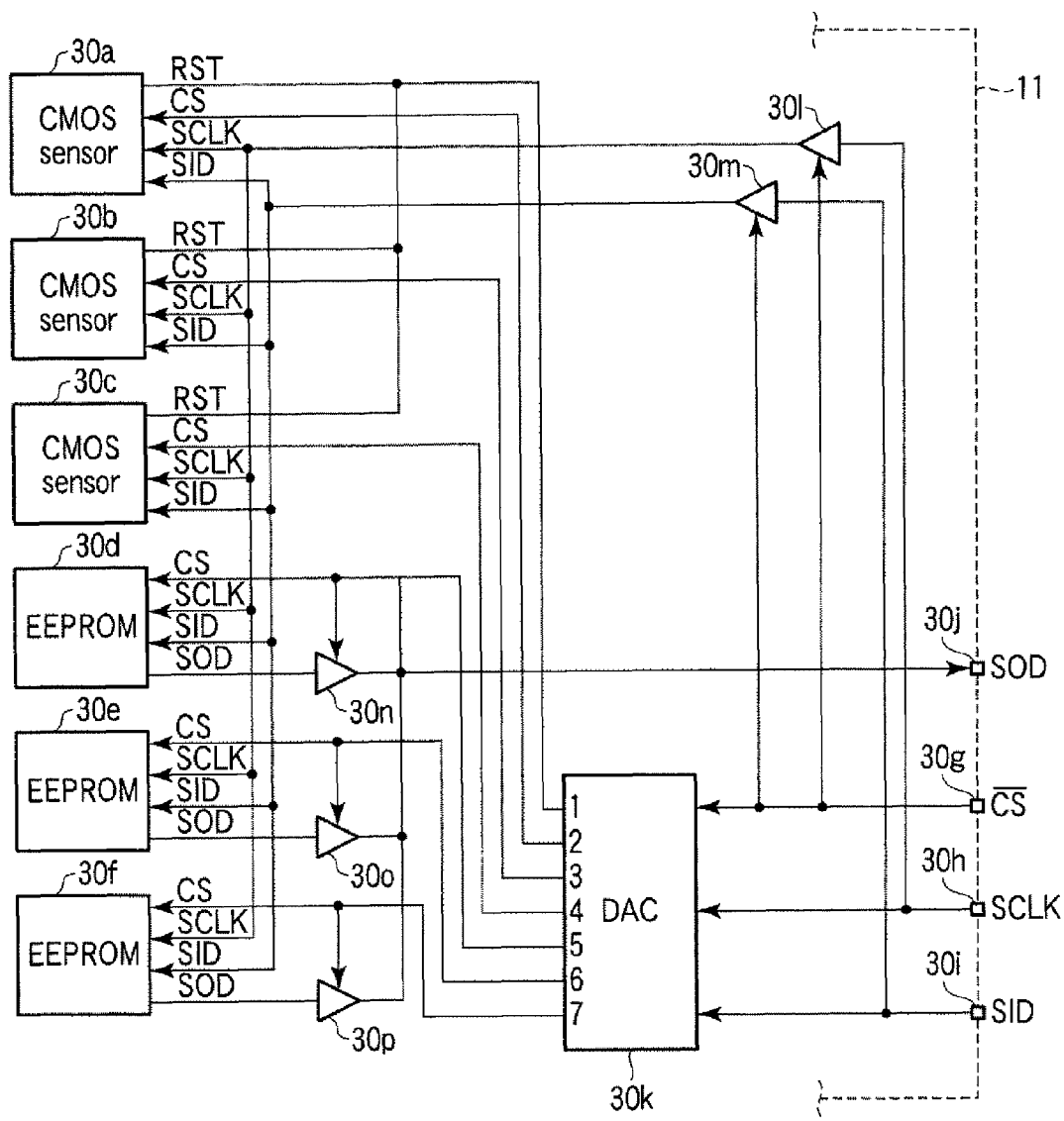
FIG. 2 is a block configuration diagram for describing an example of a camera head of the head-separated camera according to the embodiment.

FIG. 2 represents an example of a case that the MPU 23 of the CCU 12 controls six control target devices in accordance with the three-line-type serial bus control scheme, for the camera head 11 including six control target devices which are three CMOS sensors 30a, 30b, and 30c and three electrically-erasable-and-programmable read only memories (EEPROM) 30d, 30e, and 30f.

Each of the CMOS sensors 30a to 30c is provided with an input end for a reset signal RST, an input end for a chip select signal CS, an input end for a serial clock SCLK, and an input end for serial input data SID. Also, each of the EEPROMs 30d to 30f is provided with an input end for the chip select signal CS, an input end for the serial clock SCLK, an input end for the serial input data SID, and an output end for serial output data SOD.

Further, the camera head 11 is provided with an input end 30g for the chip select signal CS, an input end 30h for the serial clock SCLK, an input end 30i for the serial input data SID, and an output end 30j for the serial output data SOD. These input ends 30g to 30i and the output end 30j each are connected to the MPU 23 of the CCU 12 through the control signal bus line 26 constituting part of the camera cable 13, to make information communicable therebetween.

Of these ends, the input end 30g for the chip select signal CS, the input end 30h for the serial clock SCLK, and the input end 30i for the serial input data SID are connected to a digital-to-analog converter (DAC) 30k. The DAC 30k comprises first to seventh output ends 1 to 7, and a reset signal RST common to the CMOS sensors 30a to 30c is output from the first output end 1.

The DAC 30k outputs a chip select signal CS to be supplied to the CMOS sensor 30a from the second output end 2, a chip select signal CS to be supplied to the CMOS sensor 30b from the third output end 3, as well as a chip select signal CS to be supplied to the CMOS sensor 30c from the fourth output end 4.

Further, the DAC 30k outputs a chip select signal CS to be supplied to the EEPROM 30d from the fifth output end 5, a chip select signal CS to be supplied to the EEPROM 30e from the sixth output end 6, as well as a chip select signal CS to be supplied to the EEPROM 30f from the seventh output end 7.

The serial clock SCLK supplied to the input end 30h is supplied in common to each of the CMOS sensors 30a to 30c and EEPROMs 30d to 30f through a gate module 30l which is controlled to open/close based on the chip select signal CS supplied to the input end 30g. Further, the serial input data SID supplied to the input end 30i is supplied in common to each of the CMOS sensors 30a to 30c and EEPROMs 30d to 30f through a gate module 30m which is also controlled to open/close based on the chip select signal CS supplied to the input end 30g.

The serial output data SOD from the EEPROM 30d is derived from the output end 30j through a gate module 30n which is controlled to open/close based on the chip select signal CS output from the fifth output end 5 of the DAC 30k.

The serial output data SOD from the EEPROM 30e is derived from the output end 30j through a gate module 30o which is controlled to open/close based on the chip select signal CS output from the sixth output end 6 of the DAC 30k.

The serial output data SOD from the EEPROM 30f is derived from the output end 30j through a gate module 30p which is controlled to open/close based on the chip select signal CS output from the seventh output end 7 of the DAC 30k.

Figure 3:
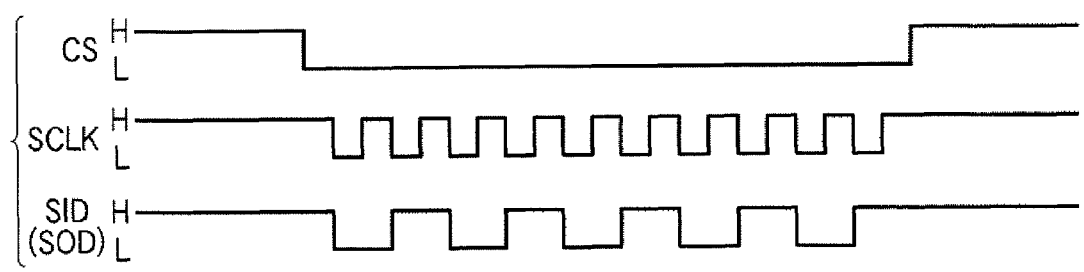
FIG. 3 is a timing chart for describing control operation for control target devices in the camera head represented in FIG. 2, according to the embodiment.

Each of the CMOS sensors 30a to 30c, EEPROMs 30d to 30f and DAC 30k as described above is a control target device to be controlled, and is selected when the chip select signal CS is activated, i.e., inverted from a level H (high) to a level L (low), as represented in FIG. 3. In this state of being selected, input of the serial input data SID and output of the serial output data SOD from the EEPROMs 30d to 30f are performed in synchronization with the serial clock SCLK.

Figure 4:
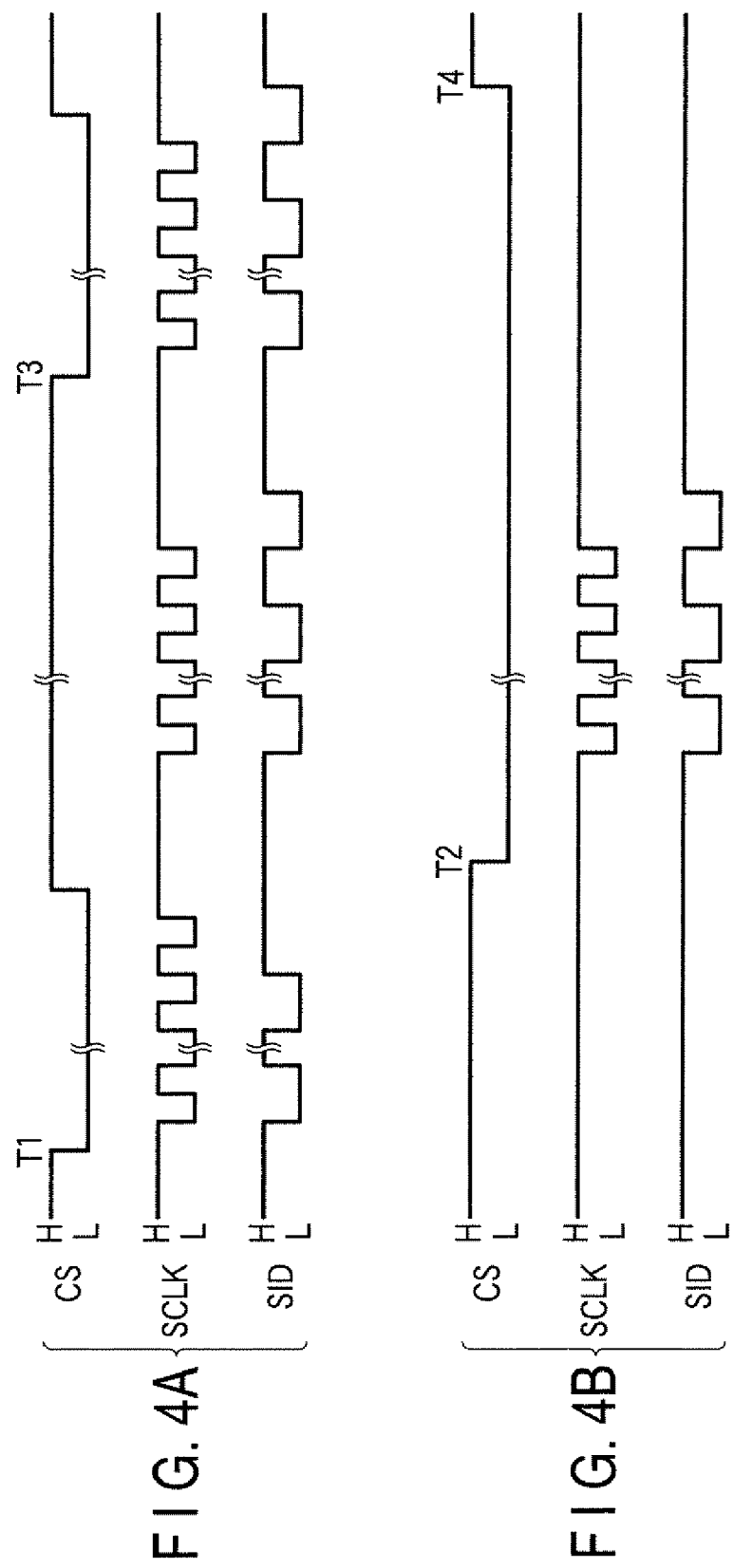
FIGS. 4A and 4B each are a timing chart for describing control operation for control target devices by a DAC in the camera head represented in FIG. 2, according to the embodiment.

In the camera head 11 represented in FIG. 2, operation of the MPU 23 of causing the CMOS sensor 30c to input serial input data SID will be described with reference to timing charts represented in FIGS. 4A and 4B. That is, FIG. 4A represents a chip select signal CS, a serial clock SCLK, and serial input data SID which are input to the DAC 30k. FIG. 4B represents a chip select signal CS, a serial clock SCLK, and serial input data SID which are input to the CMOS sensor 30c.

At first, as represented in FIG. 4A, the MPU 23 activates the chip select signal CS (to the level L) which is input to the DAC 30k at a time point T1. Then, the DAC 30k is selected and inputs the serial input data SID in synchronization with the serial clock SCLK which is supplied from the MPU 23. After inputting the serial input data SID to the DAC 30k, the MPU 23 inactivates the chip select signal CS (to the level H) input to the DAC 30k.

In this case, a command for controlling the DAC 30k to activate only the chip select signal CS (to the level L) supplied to the CMOS sensor 30s is written in the serial input data SID input to the DAC 30k. Therefore, the DAC 30k outputs a signal of the level L from the fourth output end 4 thereof at a time point T2, as represented in FIG. 4B. That is, only the chip select signal CS supplied to the CMOS sensor 30c is activated (to the level L), and the CMOS sensor 30c is selected.

At this time, as represented in FIG. 4A, the MPU 23 has already inactivated the chip select signal CS (to the level H), and the gate modules 30j and 30m are therefore both open. Thus, in a state that the CMOS sensor 30c is selected and the gate modules 30j and 30m are both open, the MPU 23 outputs the serial clock SCLK and the serial input data SID.

Accordingly, as represented in FIG. 4B, the selected CMOS sensor 30c is input with the serial clock SCLK and the serial input data SID which are output from the MPU 23. The serial input data SID is input to the CMOS sensor 30c in synchronization with the serial clock SCLK.

In this manner, input of the serial input data SID to the CMOS sensor 30c is completed, and the MPU 23 then activates the chip select signal CS (to the level L) input to the DAC 30k again at a time point T3, as represented in FIG. 4A. Then, the DAC 30k is selected and inputs the serial input data SID in synchronization with the serial clock SCLK supplied from the MPU 23.

In this case, a command for controlling the DAC 30k to inactivate the chip select signal CS supplied to the CMOS sensor 30c (to the level H) is written in the serial input data SID input to the DAC 30k. Therefore, the DAC 30k outputs a signal of the level H from the fourth output end 4 at a time point T4, as represented in FIG. 4B. That is, the chip select signal CS supplied to the CMOS sensor 30c is inactivated (to the level H), and the CMOS sensor 30c is released from the selected state.

Input of serial input data SID and output of serial output data SOD with respect to the other CMOS sensors 30a and 30b and the EEPROMs 30d to 30f can be achieved with ease as the MPU 23 controls the DAC 30k to select a control target device in the same manner as described above.

However, the gate modules 30n to 30p which open/close output of the serial output data SOD from the EEPROMs 30d to 30f are open when corresponding chip select signals CS output from the fifth to seventh output ends 5 to 7 of the DAC 30k are active (at the level L), respectively.

According to the camera head 11 configured as represented in FIG. 2, the MPU 23 selects the DAC 30k by a chip select signal CS so that which of the CMOS sensors 30a to 30c and EEPROMs 30d to 30f should be selected is specified by the serial input data SID. Therefore, even if the number of control target devices increases, the number of control signal lines for transferring the chip select signal CS need not be increased. Accordingly, downsizing of the camera head 11 can be effectively promoted.

The DAC 30k can respond to whatever different input/output levels the CMOS sensors 30a to 30c and EEPROMs 30d to 30f as control target devices have. For example, each of the CMOS sensors 30a to 30c can be supplied with a level H of 2.5 V and each of the EEPROMs 30d to 30f can be supplied with a level L of 3.3 V, in case where the CMOS sensors 30a to 30c each have a level H of 2.5 V and a level L of 0 V and the EEPROMs 30d to 30f each have a level H of 3.3 V and a level L of 0 V. In this case, the DAC 30k preferably has a level H of 3.3 V.

If plural control target devices have respectively different levels H, a buffer need be provided to convert levels of the input serial clock SCLK and the serial input data SID in correspondence with the levels H of the respective control target devices.

FIG. 5 represents an example modification to the camera head 11 represented in FIG. 2. FIG. 5 will now be described denoting the same components as those in FIG. 2 at the same reference symbols. The DAC 30k is provided with an eighth output end 8, and a preset direct current level which is, for example, a level H (3.3 V) is output from an output end 30q to the CCU 12.

Figure 6:
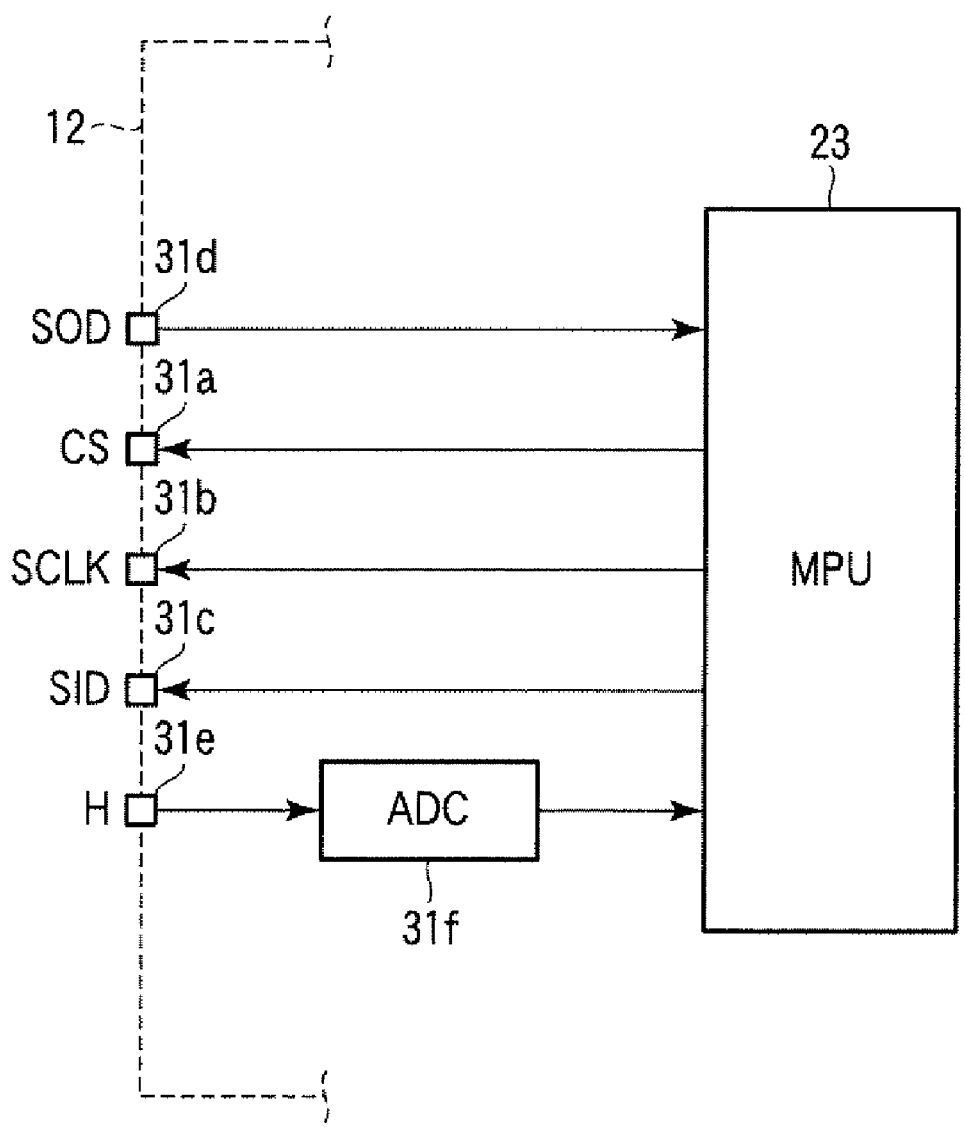
FIG. 6 is a block configuration diagram for describing a signal processing system of a CCU connected to the camera head represented in FIG. 5, according to the embodiment.

As represented in FIG. 6, the CCU 12 comprises: output ends 31a, 31b, and 31c for respectively outputting a chip select signal CS, a serial clock SCLK, and serial input data SID from the MPU 23 to the camera head 11; an input end 31d for inputting the serial output data SOD output from the camera head 11 to the MPU 23; and an input end 31e for inputting the direct current level H output from the camera head 11.

The direct current level H input to the input end 31e among the aforementioned ends is supplied to an analog-to-digital converter (ADC) 31f, and is then supplied to the MPU 23 after being converted into digital data corresponding to the direct current level H. Further, the MPU 23 can measure a cable length of the camera cable 13 by determining how much the direct current level H output from the DAC 30k has decreased at the time when the direct current level H is input to the input end 31e. Naturally in this case, the more the direct current level H decreases, the longer the cable length is.

That is, in case of a head-separated camera, the length of the camera cable 13 need be detected in order to manage a delay amount of data transferred between the camera head 11 and the CCU 12. As the direct current level H output from the DAC 30k in the side of the camera head 11 is detected by the CCU 12, the length of the camera cable 13 can be easily measured.

FIG. 7 represents another example of a case that in a camera head 11 comprising three control target devices 32a, 32b, and 32c, a MPU 23 of a CCU 12 controls the three control target devices 32a to 32c in accordance with the three-line-type serial bus control scheme.

Each of the control target devices 32a to 32c is provided with an input end for a chip select signal CS, an input end for a serial clock SCLK, an input end for serial input data SID, and an output end for serial output data SOD.

Further, the camera head 11 is provided with an input end 32d for the chip select signal CS, an input end 32e for the serial clock SCLK, an input end 32f for the serial input data SID, and an output end 32g for the serial output data SOD. These input ends 32d to 32f and the output end 32g each are connected to the MPU 23 of the CCU 12 through a control signal bus line 26 constituting part of a camera cable 13, to make information communicable therebetween.

These input ends 32d to 32f and the output end 32g are connected to each of the control target devices 32a to 32c through a switcher 33. That is, the chip select signal CS, serial clock SCLK, and serial input data SID which are respectively supplied to the input ends 32d to 32f are supplied to a decoder 33a constituting part of the switcher 33.

The chip select signal CS, serial clock SCLK, and serial input data SID which are supplied to the input ends 32d to 32f can be supplied to the control target device 32a, respectively through gate modules 33b, 33c, and 33d which are controlled to open/close based on an output of the decoder 33a.

Further, the chip select signal CS, serial clock SCLK, and serial input data SID which are supplied to the input ends 32d to 32f can also be supplied to the control target device 32b, respectively through gate modules 33e, 33l, and 33g which are controlled to open/close based on the output of the decoder 33a.

Also, the chip select signal CS, serial clock SCLK, and serial input data SID which are supplied to the input ends 32d to 32f can be supplied to the control target device 32c, respectively through gate modules 33h, 33i, and 33j which are controlled to open/close based on the output of the decoder 33a.

Further, the serial output data SOD from the control target device 32a is derived from the output end 32g through a gate module 33k which is controlled to open/close based on the chip select signal CS output from the gate module 33b.

The serial output data SOD from the control target device 32b is derived from the output end 32g through a gate module 33l which is controlled to open/close based on the chip select signal CS output from the gate module 33e.

Further, the serial output data SOD from the control target device 32c is derived from the output end 32g through a gate module 33m which is controlled to open/close based on the chip select signal CS output from toe gate module 33h.

Each of the control target devices 32a to 32c is selected when the chip select signal CS is activated, i.e., inverted from a level H to a level L, as represented in FIG. 3. In this selected state, input of the serial input data SID and output of the serial output data SOD are performed in synchronization with the serial clock SCLK.

In the camera head 11 configured as represented in FIG. 7, example operation of the MPU 23 of inputting the serial input data SID to the control target device 32b will be described with reference to a timing chart represented in FIG. 8.

At first, the MPU 23 varies the serial input data SID at a time point T1 with the chip select signal CS maintained in an inactive (level H) state. In this case, the serial input data SID is pulse width modulation data in which a level-L period corresponding to 1.5 cycles of the serial clock SCLK is located at the head, and subsequently, data continues taking a level-L period corresponding to 0.5 cycles of the serial clock SCLK as a logic value "0" as well as a level-L period corresponding to 1 cycle of the serial clock SCLK as a logic value "1".

In FIG. 8, the serial input data SID indicates a logic value "0010" after a level-L period corresponding to 1.5 cycles of the serial clock SCLK. The logic value "0010" specifies the control target device 32b.

Meanwhile, the decoder 33a which constitutes part of the switcher 33 of the camera head 11 recognizes the serial input data SID as a command for specifying any of the control target devices 32a to 32c when the serial input data SID is varied with the chip select signal CS maintained inactive (level H).

In this case, the serial input data SID is a command which specifies "0010", i.e., the control target device 32b. At this time, the decoder 33a controls each of the gate modules 33e to 33g to open so that the chip select signal CS, serial clock SCLK, and serial input data SID supplied respectively to the input ends 32d to 32f are supplied to the control target device 32b.

After thus controlling the gate modules 33e to 33g corresponding to the control target device 32b to open, the MPU 23 activates the chip select signal CS (to the level L) at a time point T2, and outputs the serial clock SCLK and the serial input data SID synchronized with the serial clock SCLK. In this manner, the control target device 32b is selected, and serial input data SID is input to the control target device 32b in synchronization with the serial clock SCLK.

The serial output data SOD from the control target device 32b is derived from the output end 32g through a gate module 33l which is controlled to open when the chip select signal CS output from the gate module 33e is active (level L).

With respect to the other control target devices 32a and 32c, input of serial input data SID and output of serial output data SOD can be performed with ease as the MPU 23 controls the switcher 33 in the same manner as described above.

According to the camera head 11 configured as represented in FIG. 7, the MPU 23 outputs a command for specifying any of the control target devices 32a to 32c by the serial input data SID when the chip select signal CS is inactive (level L). Further, the decoder 33a recognizes, as a command, the serial input data SID which is supplied when the chip select signal CS is inactive (level L). The decoder 33a controls each of the gate modules 33b to 33m so as to allow input of the chip select signal CS, serial clock SCLK, and serial input data SID, and output of the serial output data SOD with respect to only any of the control target devices 32a to 32c which is specified by the command. Therefore, even if the number of control target devices increases, the number of control signal lines for transferring the chip select signal CS need not be increased. Accordingly, downsizing of the camera head 11 can be effectively promoted.

Meanwhile, if the control target devices 32a to 32c have respectively different levels H, each of the gate modules 33b to 33m can be equipped with a buffer function to convert levels of input/output data in correspondence with the levels H of the respective control target devices 32a to 32c, usefully as a configuration.

FIG. 9 represents another example in which the MPU 23 specifies the control target device 32b in the camera head 11 configured as represented in FIG. 7. That is, the MPG 23 varies the serial input data SID at a time point T1, with the chip select signal CS maintained in an inactive (level H) state.

In this case, the serial input data SID has a data configuration as follows. A start bit S1 corresponding to one cycle of the serial clock SCLK is located at the head. Subsequently, data continues taking a level-L period corresponding to 1 cycle of the serial clock SCLK as a logic value "0" as well as a level-H period corresponding to 1 cycle of the serial clock SCLK as a logic value "1". Finally, a stop bit 52 corresponding to 1 cycle of the serial clock SCLK is located at the tail. In FIG. 9, data indicating a logic value "0010" is inserted between a start bit S and a stop bit S, and specifies the control target device 32b.

Meanwhile, the decoder 33a recognizes that the control target device 32b is specified, based on the serial input data SID which has been supplied when the chip select signal CS has been in an inactivate (level H) state. The decoder 33a then controls each of the gate modules 33e to 33g to open so that the chip select signal CS, serial clock SCLK, and serial input data SID supplied respectively to the input ends 32d to 32f are supplied to the control target device 32b.

After thus controlling the gate modules 30e to 33g corresponding to the control target device 32b to open, the MPU 23 activates the chip select signal CS (to the level L) at a time point T2, and outputs the serial clock SCLK and the serial input data SID synchronized with the serial clock SCLK. In this manner, the control target device 32b is selected, and the serial input data SID is input in synchronization with the serial clock SCLK.

Further, the serial output data SOD from the control target device 32b is derived from the output end 32g through a gate module 33l which is controlled to open when the chip select signal CS output from the gate module 33e is activate (level L).

With respect to the other control target devices 32a and 32c, input of serial input data SID and output of serial output data SOD can be achieved with ease as the MPU 23 controls the switcher 33 in the same manner as described above.

FIG. 10 represents still another example in which a MPU 23 specifies the control target device 32b in the camera head 11 configured as represented in FIG. 7. That is, the MPU 23 outputs the serial clock SCLK at a time point T1, with the chip select signal CS maintained in an inactive (level H) state, and varies the serial input data SID in synchronization with the serial clock SCLK.

In this case, the serial input data SID has a data configuration in which data continues taking a level-L period corresponding to 1 cycle of the serial clock SCLK as a logic value "0" as well as a level-H period corresponding to 1 cycle of the serial clock SCLK as a logic value "1". In FIG. 10, the serial input data SID indicates a logic value "0010", and specifies the control target device 32b.

Meanwhile, the decoder 33a recognizes that the control target device 32b is specified, based on the serial input data SID which has been supplied along with the serial clock SCLK when the chip select signal CS has been in an inactivate (level H) state. The decoder 33a then controls each of the gate modules 33e to 33g to open so that the chip select signal CS, serial clock SCLK, and serial input data SID supplied respectively to the input ends 32d to 32f are supplied to the control target device 32b.

After thus controlling the gate modules 30e to 33g corresponding to the control target device 32b to open, the MPU 23 activates the chip select signal CS (to the level L) at a time point T2, and outputs the serial clock SCLK and the serial input data SID synchronized with the serial clock SCLK. In this manner, the control target device 32b is selected, and the serial input data SID is input in synchronization with the serial clock SCLK.

Further, the serial output data SOD from the control target device 32b is derived from the output end 32g through the gate module 33l which is controlled to open when the chip select signal CS output from the gate module 33e is inactivate (level L).

With respect to the other control target devices 32a and 32c, input of serial input data SID and output of serial output data SOD can be achieved with ease as the MPU 23 controls the switcher 33 in the same manner as described above.

Figure 11:
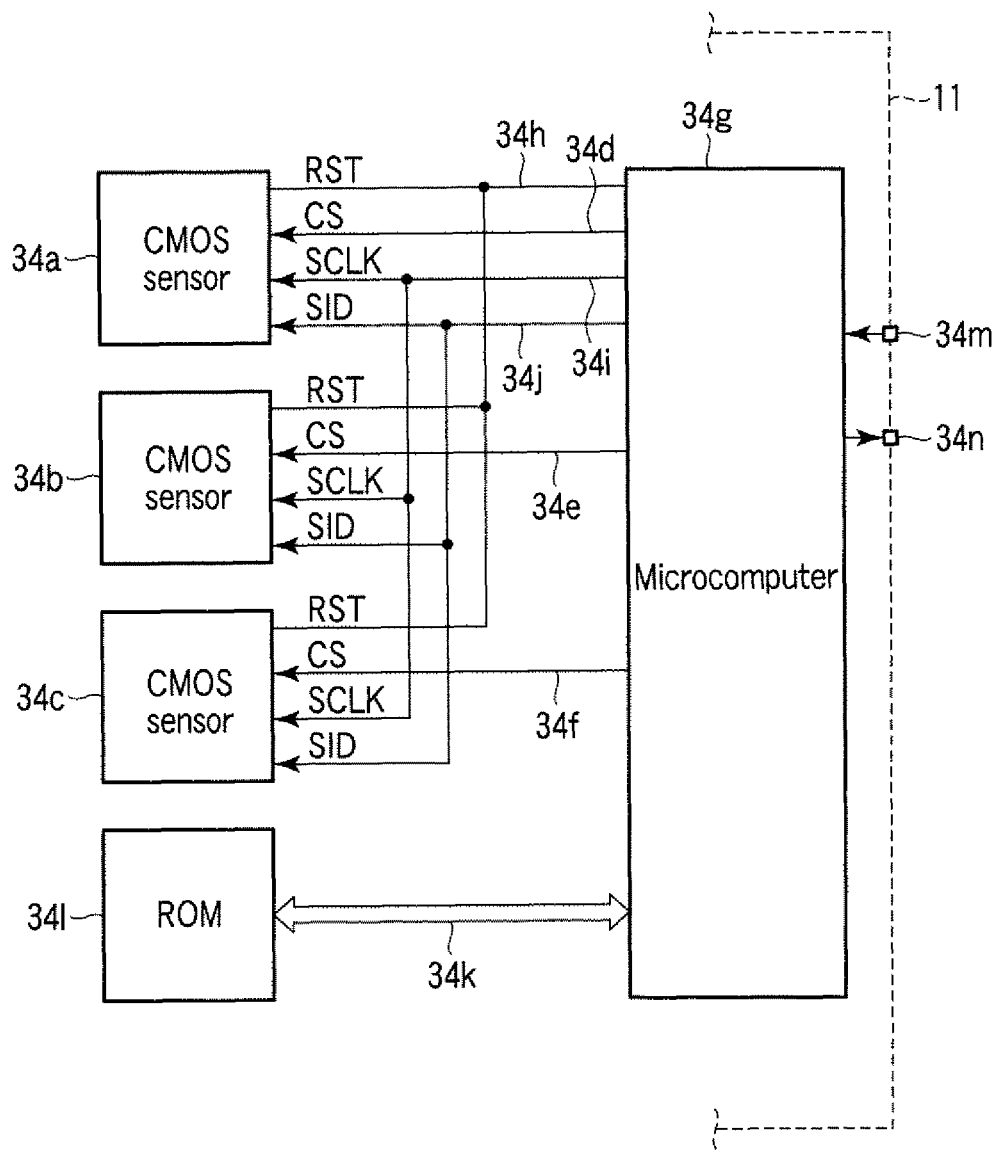
FIG. 11 is a block configuration diagram for describing a still another example of the camera head in the head-separated camera according to the embodiment.

FIG. 11 represents an example of a case that in a camera head 11 comprising three CMOS sensors 34a, 34b, and 34c as control target devices, a MPU 23 of a CCU 12 controls the three control target devices in accordance with a two-line serial bus control scheme.

Each of the CMOS sensors 34a to 34c is provided with an input end for a reset signal RST, an input end for a chip select signal CS, an input end for a serial clock SCLK, and an input end for serial input data SID.

Among these ends, the input ends of the CMOS sensors 34a to 34c for the chip select signal CS are connected to a microcomputer 34g respectively through individual signal lines 34d, 34e, and 34f.

The input ends for the reset signal RST, serial clock SCLK, and serial input data SID for the reset signal RST in each of the CMOS sensors 34a to 34c are connected to the microcomputer 34g respectively through common signal lines 34h, 34i, and 34j.

The microcomputer 34g is connected to a ROM 341 through a parallel bus 34k. Further, the ROM 341 performs data writing/reading, based on control from the microcomputer 34g.

The camera head 11 is provided with: an input end 34m which receives data output from the MPU 23 of the CCU 12 and supplies the data to the microcomputer 34g; and an output end 34n which outputs data to be transferred from the microcomputer 34g to the MPU 23. The input end 34m and the output end 34n each are connected to the MPU 23 of the CCU 12 through a control signal bus line 26 which constitutes part of a camera cable 13, to make information communicable.

Figure 12:
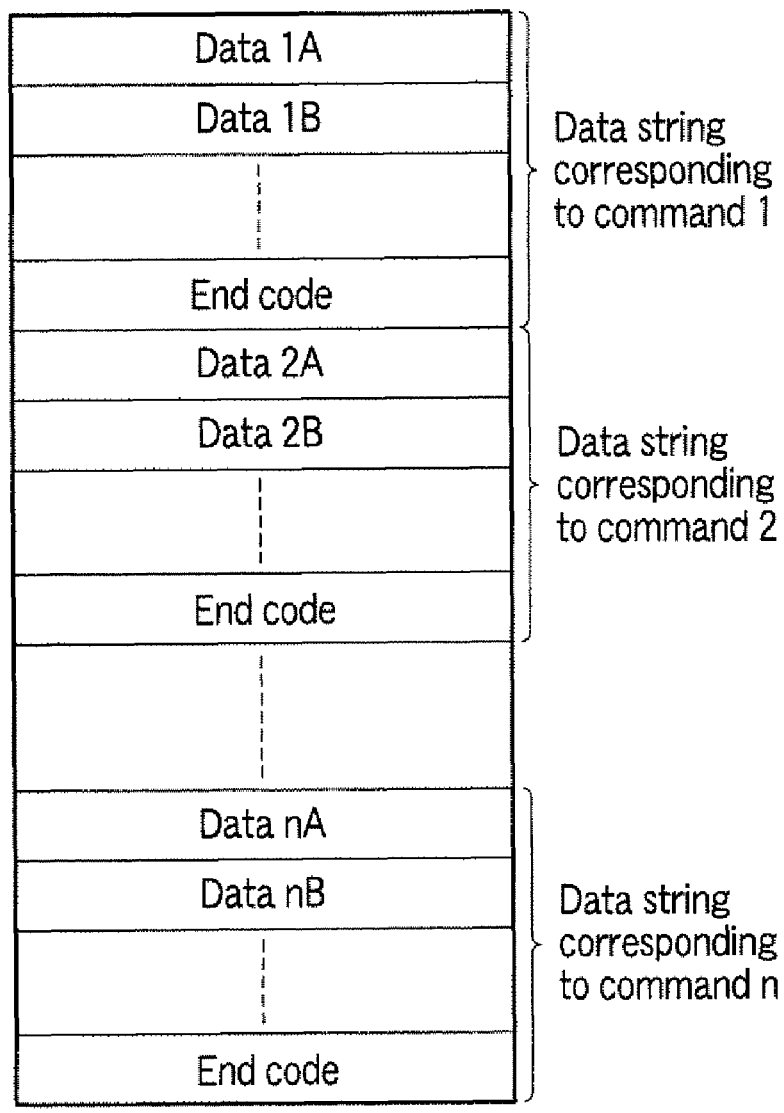
FIG. 12 is a diagram for describing data strings stored in a ROM in the camera head represented in FIG. 11, according to the embodiment.

As represented in FIG. 12, the ROM 341 stores data strings corresponding to various commands 1, 2, . . . , n which are output from the MPU 23 to the microcomputer 34g. For example, a data string corresponding to the command 1 consists of plural data items 1A, 1B, . . . , and an end code. A data string corresponding to the command 2 consists of plural data items 2A, 2B, . . . , and an end code. A data string corresponding to the command n consists of plural data items nA, nB, . . . , and an end code.

Figure 13:
FIG. 13 is a diagram for describing details of a data string stored in the ROM in the camera head represented in FIG. 11, according to the embodiment.

Of these data items, the data item 1A consists of a device identification (ID) for specifying a control target device, and main data, as represented in FIG. 13. The other data items 1B, . . . , 2A, 2B, . . . , nA, nB, . . . , are configured in the same manner as in the data item 1A. The device ID consists of, for example, 4 bits. "0000" specifies the CMOS sensor 34*a*. "0001" specifies the CMOS sensor 34*b*. "0010" specifies the CMOS sensor 34*c*.

Figure 14:
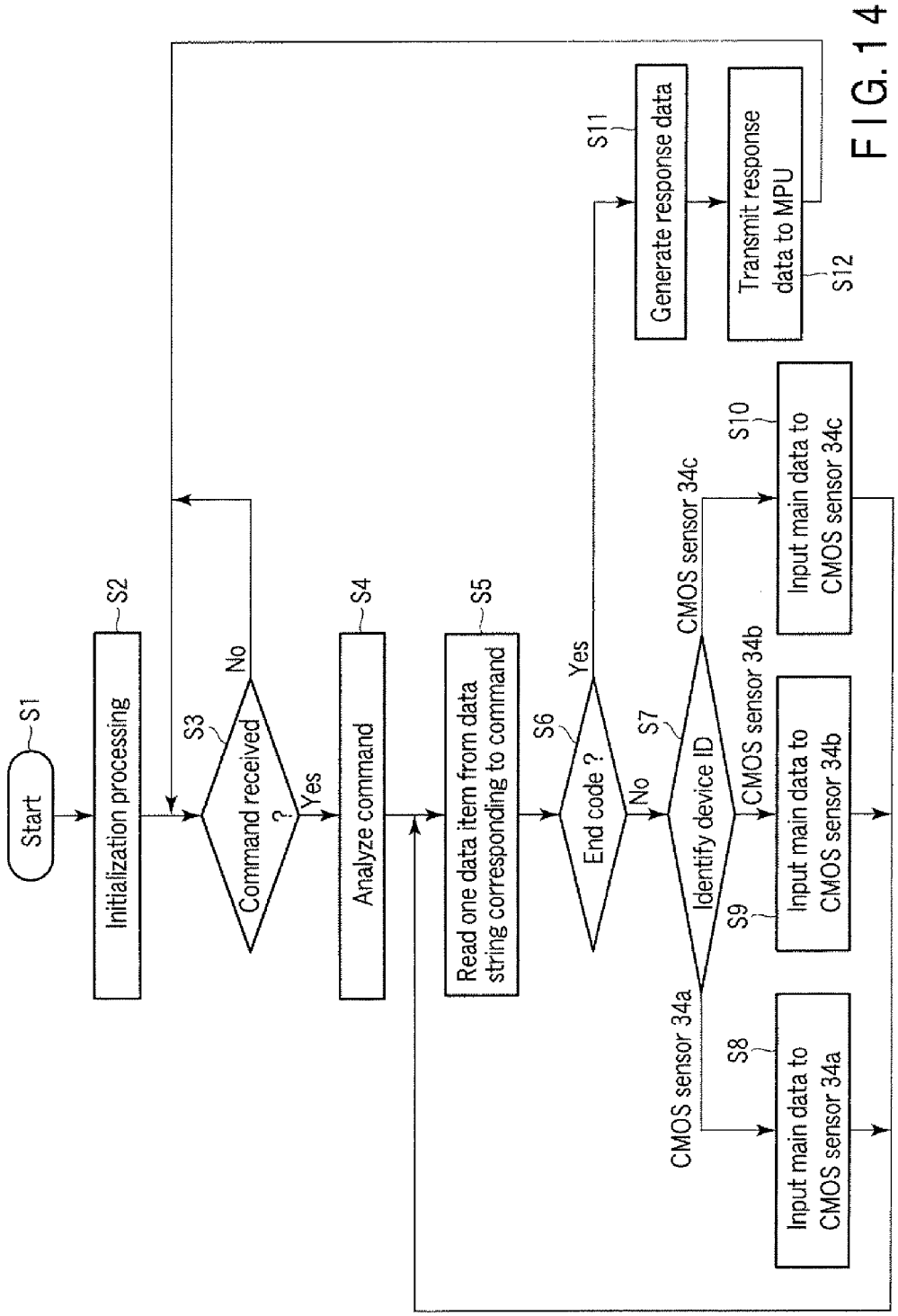
FIG. 14 is a flowchart for describing an example of control operation for control target devices by a microcomputer in the camera head represented in FIG. 11, according to the embodiment.

In the camera head 11 configured as represented in FIG. 11, example operation of the MPU 23 of specifying and causing any of the CMOS sensors 34*a* to 34*c* to input serial input data SID will now be described below with reference to a flowchart represented in FIG. 14.

This operation is started when the power supply of the camera head 11 is powered on (step S1). Then, the microcomputer 34*g* performs a preset initialization processing in a step S2, and thereafter determines whether a command has been received from the MPU 23 by the input end 34*m* or not in a step S3.

If a command is determined to have been received (YES), the microcomputer 34*g* analyzes the received command in a step S4, and reads, from the ROM 341, any one of data items contained in a data string corresponding to the command in a step S5. Thereafter, the microcomputer 34*g* determines whether the read data item is an end code or not in a step S6.

If the read data item is not determined to be an end code (NO), the microcomputer 34*g* identifies the device ID of the read data item in a step S7. If the device ID specifies the CMOS sensor 34*a*, the microcomputer 34*g* activates the chip select signal CS supplied to the CMOS sensor 34*a* (to the level L) in a step S8, and outputs main data of the read data item as serial input data SID. In this manner, input of the main data to the specified CMOS sensor 34*a* is completed. Thereafter, the microcomputer 34*g* is returned to the processing of the step S5, and performs reading of a next data item.

Alternatively, if the device ID specifies the CMOS sensor 34*b* in the step S7, the microcomputer 34*g* activates the chip select signal CS supplied to the CMOS sensor 34*b* (to the level L) in a step S9, and outputs main data of the read data item as serial input data SID. In this manner, input of the main data to the specified CMOS sensor 34*b* is completed. Thereafter, the microcomputer 34*g* is returned to the processing of the step S5, and performs reading of a next data item.

Still alternatively, if the device ID specifies the CMOS sensor 34*c* in the step S7, the microcomputer 34*g* activates the chip select signal CS supplied to the CMOS sensor 34*c* (to the level L) in a step S10, and outputs main data of the read data item as serial input data SID. In this manner, input of the main data to the specified CMOS sensor 34*c* is completed. Thereafter, the microcomputer 34*g* is returned to the processing of the step S5, and performs reading of a next data item.

Otherwise, if the read data item is determined to be an end code (YES) in the step S6, the microcomputer 34*g* generates response data to the MPG 23 in a step S11, and transmits the response data to the MPG 23 through the output end 34*n* in a step S12. The MPG 23 is then returned to the processing of the step S3.

By receiving the response data, the MPG 23 completes the processing for the microcomputer 34*g* of the camera head 11, and can thereby detect itself in a state capable of receiving a next command. This response data also consists of a device ID, which specifies the MPG 23, and main data as represented in FIG. 13.

The camera head 11 configured as represented in FIG. 11 comprises the microcomputer 34*g* which receives various commands output from the MPU 23, and the ROM 341 which stores data strings corresponding to the various commands. Further, the microcomputer 34*g* reads a data string from the ROM 341, corresponding to a command from the MPU 23, and performs control in a manner that serial input data SID is input to any of the CMOS sensors 34*a* to 34*c* specified by the data string. Therefore, even if the number of control target devices increases, the number of control signal lines for transferring the chip select signal CS need not be increased. Accordingly, downsizing of the camera head 11 can be effectively promoted.

Each of the data strings corresponding to commands contains a device ID, which specifies any of the CMOS sensors 34*a* to 34*c* respectively as control target devices to be controlled, and main data to be supplied to the control target device specified by the device ID. It is therefore convenient that an instruction to input main data can be given to each of the plurality of control target devices by simply outputting one command from the MPU 23.

For example, if a command 1 is to set a gain for each of the CMOS sensors 34*a* to 34*c*, gain differences which are actually obtained relative to externally set gains are stored as data 1A, 1B, and 1C for the CMOS sensors 34*a* to 34*c*, respectively. Specifically, if there is no difference between an externally set gain and an actually obtained gain for the CMOS sensor 34*a*, 0 is stored as the data 1A.

If an actually obtained gain is higher by +0.1 dB than an externally set gain for the CMOS sensor 34*b*, −0.1 is stored as the data 1B. Further, if an actually obtained gain is lower by −0.1 dB than an externally set gain for the CMOS sensor 34*c*, +0.1 is stored as the data 1C.

In this manner, if a command 1 which requests the gain of each of the CMOS sensors 34*a* to 34*c* to be set to 6 dB is output from the MPU 23, the microcomputer 34*g* which receives the command 1 sets the gain of the CMOS sensor 34*a* to 6 dB, based on the value "0" stored as the data 1A.

Further, the microcomputer 34*g* sets the gain of the CMOS sensor 34*b* to 5.9 dB, based on the value "−0.1" stored as the data 1B. The microcomputer 34*g* still sets the gain of the CMOS sensor 34*c* to 6.1 dB, based on the value "+0.1" stored as the data 1C.

That is, a processing of substantially aligning the gains of the CMOS sensors 34*a* to 34*c* with 6 dB is performed by only using the command 1 which requests the gain of each of the CMOS sensors 34*a* to 34*c* to be set to 6 dB. Specifically, it is very effective that commands corresponding in number to plural control target devices need not be transmitted from the CCU 12 to the camera head 11, even in response to a request for changing settings of the plural control target devices all at once.

Figure 15:
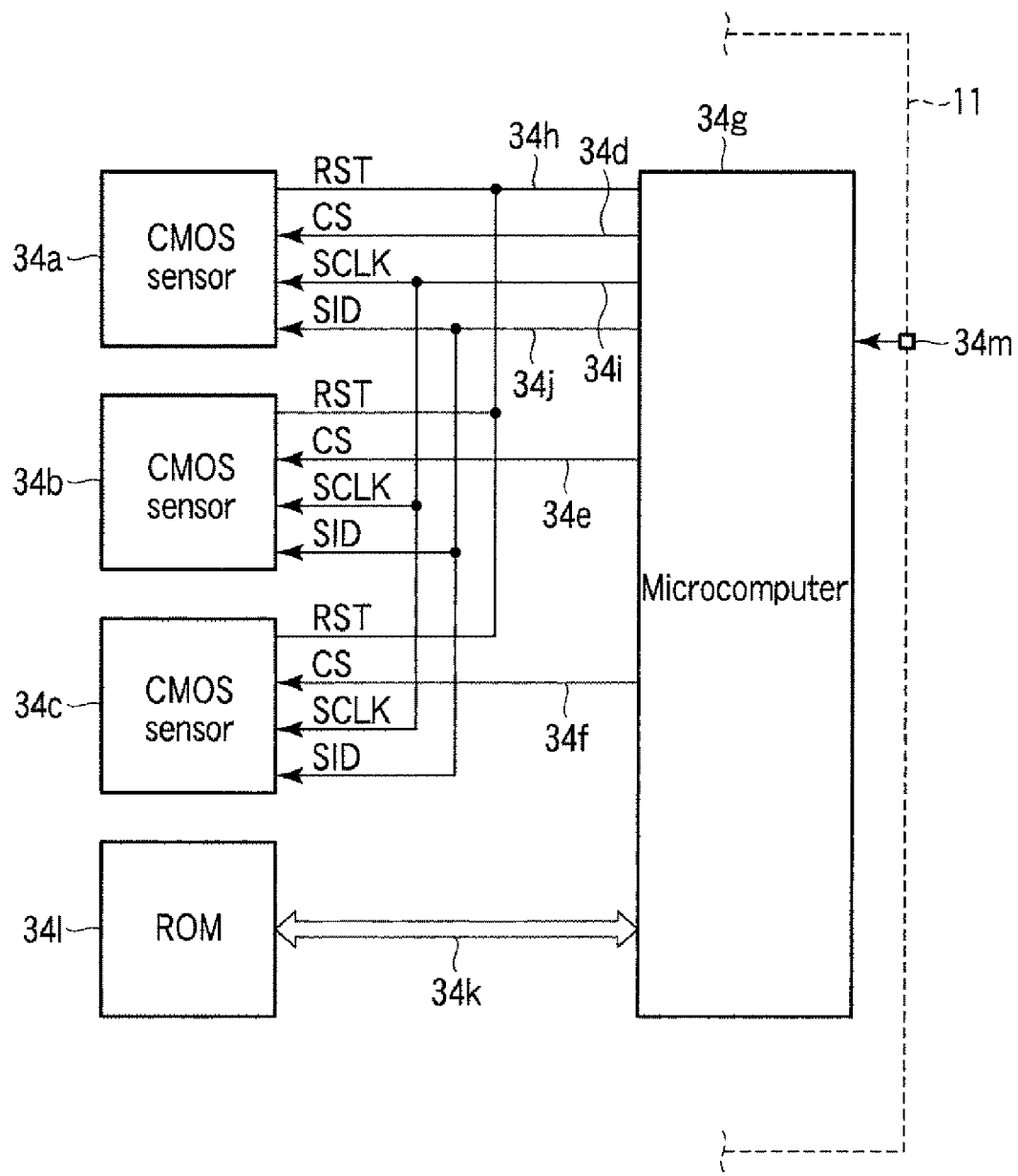
FIG. 15 is a block configuration diagram for describing an example modification to the camera head represented in FIG. 11, according to the embodiment.

FIG. 15 represents an example modification to the camera head 11 configured as represented in FIG. 11. FIG. 15 will now be described denoting the same components as those in FIG. 2 at the same reference symbols. The output end 34*n* for outputting data from the microcomputer 34*g* to the MPU 23 is removed. That is, a system in which the microcomputer 34*g* does not reply with any data to the MPU 23, i.e., a system which performs one-way information communication from the MPU 23 to the microcomputer 34*g* may be configured as represented in FIG. 15.

Figure 16:
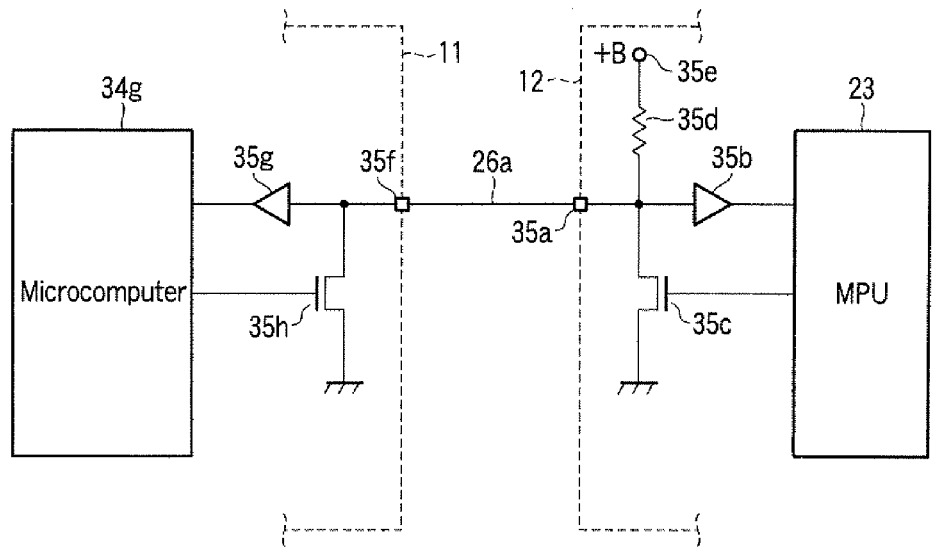
FIG. 16 is a block configuration diagram for describing an example modification to the head-separated camera according to the embodiment.

FIG. 16 represents still another example modification to the camera head 11 configured as represented in FIG. 11. That is, the control signal bus line 26 connecting the camera head 11 and the CCU 12 is constituted by one control signal line 26*a* capable of performing bidirectional information communication. The CCU 12 comprises an input/output end 35*a* connected to the control signal line 26*a*.

Further, data input through the input/output end 35*a* is supplied through the buffer 35*b* to the MPU 23. Data output from the MPU 23 to the microcomputer 34*g* of the camera head 11 is supplied to a control electrode of a switching element 35*c* whose control target electrode to be controlled is connected to the input/output end 35*a*. Further, the input/ output end 35a is connected through a resistor 35d to a power supply terminal 35e applied with a direct current voltage +B. In this manner, the data output from the MPU 23 to the microcomputer 34g of the camera head 11 is transferred, inverted, by the control signal line 26a.

The camera head 11 is provided with an input/output end 35f connected to the control signal line 26a. Data input through the input/output end 35f is supplied to the microcomputer 34g through the buffer 35g. Data output from the microcomputer 34g to the MPU 23 of the CCU 12 is supplied to a control electrode of a switching element 35h whose control target electrode to be controlled is connected to the input/output end 35f. In this manner, the data output from the microcomputer 34g to the MPU 23 of the CCU 12 is transferred, inverted, by the control signal line 26a.

Figure 17A:
FIGS. 17A to 17C each are a timing chart for describing operation of the head-separated camera represented in FIG. 16, according to the embodiment.
Figure 17B:
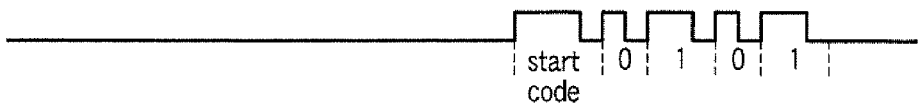
Figure 17C:
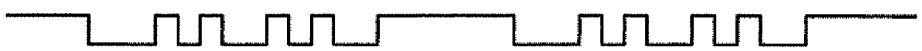

FIG. 17A represents data supplied from the MPU 23 to the control electrode of the switching element 35c. The data output from the MPU 23 is configured to contain a start code at the head, which is followed by main data. FIG. 17B represents data supplied from the microcomputer 34g to the control electrode of the switching element 35h. This data is also configured to contain a start code at the head which is followed by main data. FIG. 17C represents data transferred by the control signal line 26a.

As represented in FIG. 17C, when the MPU 23 and the microcomputer 34g alternately communicate data between each other, data output from the MPU 23 is transferred, inverted, on the control signal line 26a. Also, data output from the microcomputer 34g is transferred, inverted, on the control signal line 26a.

According to the camera head 11 represented in FIG. 16, data communication between the MPU 23 and the microcomputer 34g can be performed by only one control signal line 26a. Therefore, even if the number control target devices increases, the number of control signal lines for transferring the chip select signal CS need not be increased. Accordingly, downsizing of the camera head 11 can be effectively promoted.

Figure 18A:
FIGS. 18A to 18C each are a timing chart for describing other operation of the head-separated camera represented in FIG. 16, according to the embodiment.
Figure 18B:
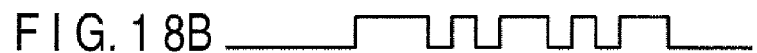
Figure 18C:

Meanwhile, if data output from the MPU 23 as represented in FIG. 18A and data output from the microcomputer 34g as represented in FIG. 18O are concurrent on the control signal line 26a, data on the control signal line 26a is expressed as an inverted logical sum of both data as represented in FIG. 18C.

Therefore, through the buffer 35b, the MPU 23 receives data which the MPU 23 itself has output to the switching element 35c. If the output data and the data thus received are not accurate inversions of each other, concurrence with output data from the microcomputer 34g is detected to occur.

Similarly, through the buffer 35b, the microcomputer 34g receives data which the microcomputer 34g itself has output to the switching element 35h. If the output data and the data thus received are not accurate inversions of each other, concurrence with output data from the MPG 23 is detected to occur.

FIG. 19 represents an example modification to the camera head 11 represented previously in FIG. 2. FIG. 19 will now be described denoting the same components as those in FIG. 2 at the same reference symbols. An input/output (I/O) expander 36 is used in place of the DAC 30k.

That is, the input end 30g for the chip select signal CS, the input end 30h for the serial clock SCLK, and the input end 30i for the serial input data SID are connected to the I/O expander 36. The I/O expander 36 comprises first to seventh output ends 1 to 7. A reset signal RST to be supplied in common to the CMOS sensors 30a to 30c is output from the first output end 1.

The I/O expander 36 outputs a chip select signal CS supplied to the CMOS sensor 30a from the second output end 2, a chip select signal CS supplied to the CMOS sensor 30b from the third output end 3, as well as a chip select signal CS supplied to the CMOS sensor 30c from the fourth output end 4.

Further, the I/O expander 36 outputs a chip select signal CS supplied to the EEPROM 30d and the gate module 30n from the fifth output end 5, a chip select signal CS supplied to the EEPROM 30e and the gate module 30o from the sixth output end 6, as well as a chip select signal CS supplied to the EEPROM 30f and the gate module 30p from the seventh output end 7.

The I/O expander 36 is selected as the MPU 23 activates the chip select signal CS (to the level L) as well. Thereafter, the I/O expander 36 activates an output end (to the level L) specified by serial input data SID supplied from the MPU 23, thereby to select a control target device to be controlled.

Thereafter, operation of supplying a selected control target device with a serial clock SCLK and serial input data SID, operation of outputting serial output data SOD from the selected control target device, and operation of the MPU 23 of selecting the I/O expander 36 again and releasing the selected control target device when input/output of serial data ends are carried out in the same manner as described with respect to the DAC 30k follows.

The I/O expander 36 outputs only one type of level H and cannot output plural types of levels H. For example, there may be supposed a case where the I/O expander 36 has a level H of 2.5 V and a level L of 0 V, each of the CMOS sensors 30a to 30c has a level H of 2.5 V and a level L of 0 V, as well as each of the EEPROMs 30d to 30f has a level H of 3.3 V and a level L of 0 V. In this case, although the I/O expander 36 can output directly the level H of 2.5 V to each of the CMOS sensors 30a to 30c, each of the EEPROMs 30d to 30f need be supplied with a level H of 3.3 V through a buffer for converting levels.

If plural control target devices have respectively different levels H, a buffer need be provided to convert levels of the input serial clock SCLK and serial input data SID in correspondence with the levels H of the respective control target devices.

Figure 20:
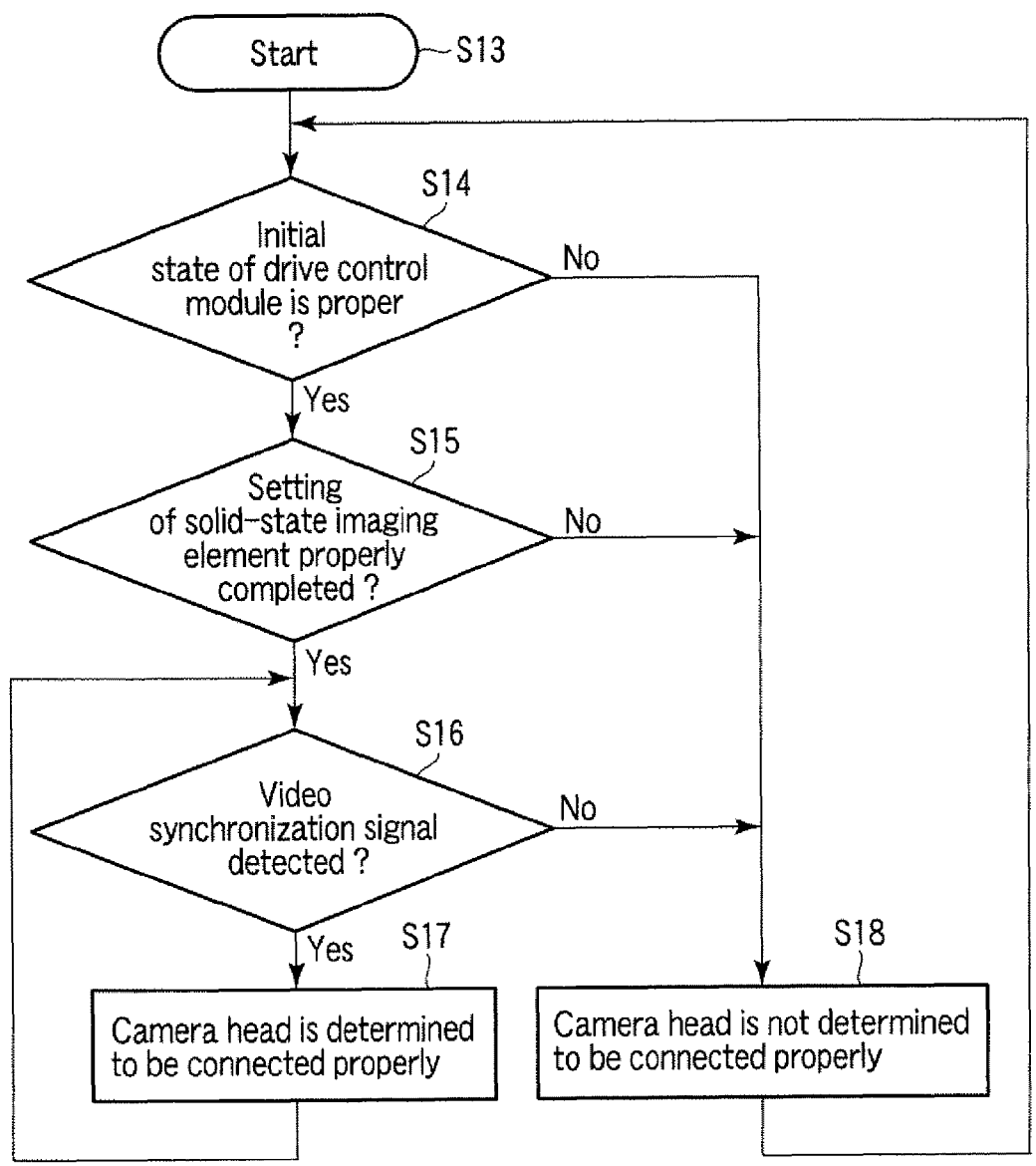
FIG. 20 is a flowchart for describing an example of a method in which the CCU detects presence or absence of connection to the camera head in the head-separated camera according to the embodiment.

Next, processing operation of the CCU 12 of detecting connection of the camera head 11 represented in FIG. 1 will now be described with reference to a flowchart in FIG. 20. This operation is started by powering on the power supply of the CCU 12 (in a step S13). Then, the MPU 23 accesses the drive control module 16 of the camera head 11 through the control signal bus line 26 in a step S14 to determine whether an initial state thereof is proper or not.

If the initial state of the drive control module 16 is determined to be proper (YES), the MPU 23 determines whether various settings are properly complete for the solid-state imaging element 15 or not in a step S15. If settings are determined to be properly complete (YES), the MPU 23 determines whether a video synchronization signal has been detected through a signal bus line 19 from the camera head 11 or not in a step S16.

If a video synchronization signal is determined to have been detected (YES), the MPU 23 determines the camera head 11 to be connected properly, in a step S17, and is then returned to the processing of the step S16.

Alternatively, if the initial state of the drive control module 16 is not determined to be proper (NO) in the step S14, if various settings are not determined to be properly complete (NO) in the step S15, or if any video synchronization signal is not determined to have been detected (NO) in the step S16, the MPU 23 does not determine the camera head 11 to be properly connected in a step S17, and is returned to the processing of the step S14.

According to the connection detection method for the camera head 11 as described above, far more accurate detection can be achieved compared with a method of detecting only whether a video synchronization signal has been obtained from the camera head 11 or not, as in prior art.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A head-separated camera device comprising:
a camera control unit;
a camera head that comprises a plurality of control target devices; and
a cable comprising a line that supplies the camera head with serial data from the camera control unit and connects the camera head and the camera control unit to each other, wherein
the camera control unit is configured to output serial data containing information for specifying a predetermined control target device being among the plurality of control target devices to be controlled, and
the camera head is configured to identify the predetermined control target device specified by the serial data received using an identification module, to supply a select signal to at least one gate module that controls routing of the serial data to the identified predetermined control target device, and to supply the serial data to the selected predetermined control target device for control.

2. The head-separated camera device of claim 1, wherein
the line of the cable is configured to supply the camera head with the select signal from the camera control unit,
the identification module comprises a conversion module that is configured to identify the predetermined control target device specified by the serial data received together with the select signal, and to supply the identified predetermined control target device with the select signal.

3. The head-separated camera device of claim 2, wherein the conversion module is constituted by a digital-to-analog converter capable of outputting an active signal at a plurality of levels corresponding to input/output levels of the plurality of control target devices.

4. The head-separated camera device of claim 3, wherein the digital-to-analog converter is configured to output a preset constant direct current level to the camera control unit through the cable, and
the camera control unit is configured to measure a length of the cable, based on a decrease amount of the direct current level output from the digital-to-analog converter.

5. The head-separated camera device of claim 1, wherein
the line of the cable is configured to supply the camera head with the select signal from the camera control unit, and
the identification module comprises a switching module that is configured to identify the predetermined control target device specified by the serial data received together with the select signal being an inactive select signal, and to perform switching such that an active select signal output from the camera control unit is supplied to the identified predetermined control target device.

6. The head-separated camera device of claim 5, wherein the switching module comprises:
a plurality of gate modules that are provided respectively corresponding to the plurality of control target devices, and are configured to perform control so as to supply the identified predetermined control target device with the active select signal output from the camera control unit; and
a decoder that is configured to identify, based on the serial data received together with the inactivate select signal, the predetermined control target device specified by the serial data, and to control any of the plurality of gate modules to open, which corresponds to the identified predetermined control target device.

7. A control method for a head-separated camera device in which a camera head and a camera control unit is connected to each other by a cable comprising a line that supplies a camera head with serial data from a camera control unit, the control method comprising:
outputting, by the camera control unit, serial data containing information for specifying a predetermined control target device to be controlled, among a plurality of control target devices to be controlled, the camera head comprises the plurality of control target devices; and
identifying, by an identification module of the camera head, the predetermined control target device specified by the serial data received;
supplying, by the identification module of the camera head, the identified predetermined control target device with an active select signal to the specified predetermined control target device, the active select signal also being for selecting routing of the serial data through at least one gate module; and
supplying, by the camera head, the serial data via that at least one gate module to the specified predetermined control target device for control.

8. A head-separated camera device comprising:
a camera control unit;
a camera head that comprises a plurality of control target devices; and
a cable comprising a line that supplies the camera head with serial data from the camera control unit and connects the camera head and the camera control unit to each other, wherein
the camera control unit is configured to output serial data containing information for specifying a predetermined control target device being among the plurality of control target devices to be controlled, and
the camera head including an input/output expander device that is configured to identify the predetermined control target device specified by the serial data received and to supply an active select signal to the identified predetermined control target device, the camera head to further supply the serial data to the selected predetermined control target device for control.

9. The head-separated camera device of claim 8, wherein the cable is configured to comprise the line that supplies the camera head with a select signal from the camera control unit.

10. A control method for a head-separated camera device in which a camera head and a camera control unit is connected to each other by a cable comprising a line that supplies a camera head with serial data from a camera control unit, the control method comprising:

outputting, by the camera control unit, serial data containing information for specifying a predetermined control target device to be controlled, among a plurality of control target devices to be controlled, the camera head comprises the plurality of control target devices; and identifying, by the camera head, the predetermined control target device specified by the serial data received;

supplying, by an I/O expander device of the camera head, the identified predetermined control target device with an active select signal to the specified predetermined control target device; and supplying, by the camera head, the serial data to the specified predetermined control target device for control.

\* \* \* \* \*